(12) United States Patent
Brouillette (10) Patent No.: US 9,106,948 B2
(45) Date of Patent: Aug. 11, 2015

(54) ADAPTIVE PID CONTROLLER FOR AUDIO/VIDEO CLOCK RECOVERY

(75) Inventor: Pat Brouillette, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 156 days.

(21) Appl. No.: 13/976,727

(22) PCT Filed: Sep. 27, 2011

(86) PCT No.: PCT/US2011/053507
§ 371 (c)(1),
(2), (4) Date: Jun. 27, 2013

(87) PCT Pub. No.: WO2013/048377
PCT Pub. Date: Apr. 4, 2013

(65) Prior Publication Data
US 2013/0278825 A1 Oct. 24, 2013

(51) Int. Cl.
*H04J 3/06* (2006.01)
*H04N 21/43* (2011.01)

(52) U.S. Cl.
CPC .......... *H04N 21/4305* (2013.01); *H04J 3/0664* (2013.01)

(58) Field of Classification Search
USPC ......... 370/516, 252, 503, 241, 465, 508, 517; 375/E7.271, 363, E7.278, 240.28, 355, 375/356, 362, 364, 365, 371
See application file for complete search history.

(56) References Cited

U.S. PATENT DOCUMENTS

| | | | |
|---|---|---|---|
| 6,369,855 B1 | 4/2002 | Chauvel et al. |
| 7,298,741 B2 | 11/2007 | Hung |
| 7,684,443 B2 | 3/2010 | Fisher et al. |
| 2004/0258188 A1 | 12/2004 | Kim et al. |
| 2010/0158051 A1 | 6/2010 | Hadzic et al. |
| 2011/0228888 A1 | 9/2011 | Gelter et al. |

FOREIGN PATENT DOCUMENTS

WO 2013/048377 A1 4/2013

OTHER PUBLICATIONS

HDMI Licensing, LLC, High-Definition Multimedia Interface, Specification Version 1.3, Jun. 22, 2006, 237 Pages.
International Search Report and Written opinion for PCT Patent Application No. PCT/US2011/053507, mailed on Apr. 18, 2012, 9 Pages.
International Preliminary Report on Patentability and Written Opinion received for PCT Patent Application No. PCT/US2011/053507, mailed on Apr. 1, 2014, 5 pages.

*Primary Examiner* — Phuongchau Ba Nguyen
(74) *Attorney, Agent, or Firm* — Lynch Law Patent Group, P.C.

(57) ABSTRACT

Systems, devices and methods are described including specifying a jitter response control parameter, receiving multiple timestamp pairs. A maximum jitter of the timestamp pairs may be determined along with an elapsed time, and a clock frequency may be adjusted if the maximum jitter is less than the elapsed time divided by the jitter response control parameter. The jitter response control parameter may be adjusted in response to changes in die jitter of the input A/V signal. Further, one or more Proportional-Integral-Derivative (PID) controller coefficients may be adjusted in response to the evaluated jitter of the timestamp pairs.

26 Claims, 8 Drawing Sheets

FIG. 8

ADAPTIVE PID CONTROLLER FOR AUDIO/VIDEO CLOCK RECOVERY

BACKGROUND

To maintain adequate quality in the playback of a broadcast Audio/Video (A/V) stream it may be necessary to recover the clock signal of the device or system that broadcasted the stream so that a playback device's A/V circuitry can be properly synchronized. Inadequate clock recovery may result in the dropping of video frames from the stream with a resulting degradation of audio quality when the dropped frames are re-sampling during A/V stream playback.

Some broadcast environments, particularly IP network environments, may impose a high and/or variable degree of jitter on an A/V stream. Such jitter may place additional mathematical burdens on the playback device's clock recovery mechanism. Proportional-Integral-Derivative (PID) controllers employed in conventional A/V clock recovery designs do not account for jitter in the stimulus. Thus, when a conventional A/V clock recovery mechanism receives a high-jitter stimulus the PID control may vary wildly and potentially may become unusable.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation or embodiment. Further, when a particular feature, structure, or characteristic is described in connection with an implementation, it is submitted that it is within the knowledge of one skilled in the art to effect such feature, structure, or characteristic in connection with other implementations whether or not explicitly described herein.

Figure 1:
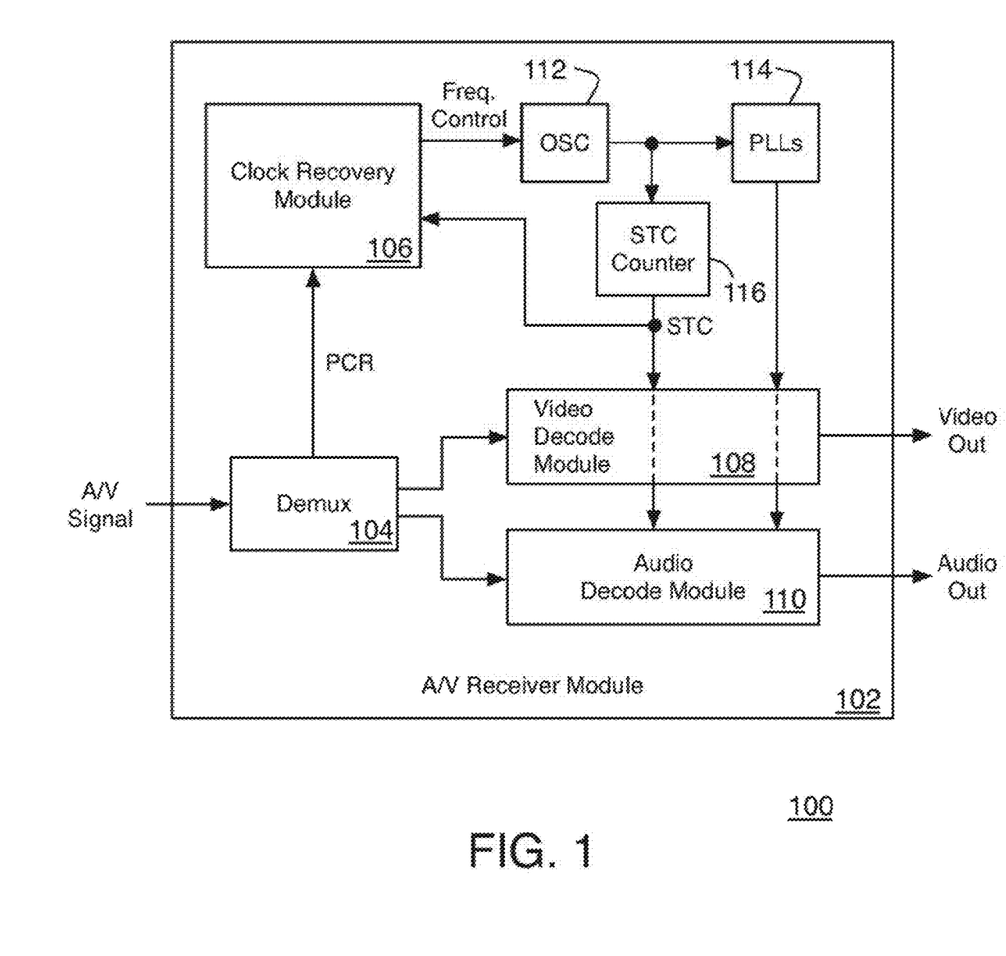
FIG. 1 is an illustrative diagram of an example system.

FIG. 1 illustrates an example device 100 in accordance with the present disclosure. In various implementations, device 100 may include an A/V receiver module 102 capable of generating video and audio output signals in response to receiving a broadcast. A/V signal such as an encoded A/V bitstream. The A/V signal received by module 102 may be generated by a A/V source device (e.g., a transmitter module) and received by module 102 over a network that may include wired and/or wireless components, including Internet Protocol (IP) network components, and that may introduce varying amounts of jitter to the A/V signal.

The input A/V signal may conform to various A/V standards, specifications or protocols. For example, the input A/V signal may be generated in conformance with the Moving Pictures Expert Group (MPEG)-2 transport stream (TS) standard (see ITU-T Rec. H.222.0, "Information technology—Generic coding of moving pictures and associated audio information: Systems," published Oct. 16, 2007). In other implementations, the input A/V signal may conform to network control protocols such as the Real Time Streaming Protocol (RTSP) (see, Internet engineering Task Force (IETF) rfc2326, published April 1998) or other network control protocols where timestamps may be placed on IP packets. In yet other implementations, the input A/V signal may conform to various wireless networking protocols such as the Wireless Gigabit Alliance (WiGig™) protocol (see WiGig™ Specification Version 1.1, published Jun. 28, 2011). Further, in various implementations, the input A/V signal may include uncompressed audio and/or video signals that may need independent audio and video clock recovery processing. For example, the input A/V signal may conform to the High-Definition Multimedia Interface (HDMI®) specification (see, e.g., HDMI® Specification Version 1.3, published Nov. 10, 2006), the Sony/Philips Digital Interconnect Format (SP-DIF) specification, or the like. In these various, non-limiting, examples, the input A/V signal may exhibit large and/or highly variable amounts of jitter.

A/V receiver module 102 may be configured to process the A/V signal according to the particular standard to which the A/V signal conforms. Although the present disclosure is not limited in application to any particular A/V specification, protocol or standard, in the interest of clarity the example devices, systems and processes disclosed herein will be described in the context of the MPEG-2 H.222 standard. In that context, the input A/V signal may include A/V data packets and associated transmitter timestamps or Program Clock Reference (PCR) timestamps generated by a source device using a System Time Clock (STC) having, for example, a frequency of 27 Mhz.

Receiver module 102 includes demux logic 104, a clock recovery module (CRM) 106, respective video and audio decode modules 108 and 110, a clock signal generator or oscillator (OSC) 112, various Phase Lock Loop (PLL) circuits 114, and an STC counter 116. Demux logic 104 may extract a transmitter TS signal (PCR signal) and separate encoded video and audio data signals from the input A/V signal using, for example, packet identifiers. The PCR signal may include a stream of PCR packets. Demux logic 104 may provide the PCR signal to CRM 106 and the encoded video and audio data signals to video and audio decode modules 108 and 110, respectively. CRM 106 may control OSC 112 to change the frequency of the signal that OSC 112 provides to STC counter 116 and PLLs 114. In response to the output of OSC 112, STC counter 116 may generate the receiver module's local TS signal (STC signal) provided to CRM 106 and decode modules 108 and 110. PLLs 114 may use the output of OSC 112 to provide respective video and audio clock signals to decode modules 108 and 110.

Because the A/V signal may include variable amounts of jitter, the PCR signal may exhibit a varying temporal delay or phase shift with respect to the receiver STC signal. As will be described in greater detail below, CRM 106 may use adaptive PID controller mechanisms or schemes in accordance with the present disclosure to compensate for jitter in the input A/V signal by modulating the receiver STC signal accordingly. CRM 106 may do so by analyzing the PCR and STC signals and using the results of that analysis to control the frequency of OSC 112 so that the delay, with respect to the PCR signal, of the receiver module's STC signal may be adaptively minimized. Receiver module 102 may then use the adapted STC signal to synchronize decoding of the A/V data by decode modules 108 and 110.

Those of skill in the art may recognize that various elements commonly found or associated with an A/V receiver have not been depicted in FIG. 1. For example, receiver module 102 may include or be associated with additional items such as video and audio buffers, clock output signals and so forth that have not been depicted in FIG. 1 in the interest of clarity. Further, those of skill in the art may recognize that in various implementations the timestamps included as part of the input A/V signal (e.g., as added by an encoder of a remote source device) may be termed PCR stamps if they are applied at the transport packet level or may be termed System Clock Reference (SCR) stamps if applied at the Packetized Elementary Stream (PES) level.

In various implementations, as will be explained in greater detail below, the value of a jitter response control parameter (C) employed by CRM module 106 may be dynamically adjusted in response to the amount of jitter appearing in an input A/V signal over a particular time interval (elapsed_time). Further, as will also be explained in greater detail below, in various implementations an A/V receiver module may adjust the frequency of its local timestamp signal (e.g., STC) in response to the maximum jitter (max_jitter) of an input A/V signal in accordance with the following pseudocode:

if (max_jitter < (elapsed_time / C))
  adjust_clock_frequency

Figure 2:
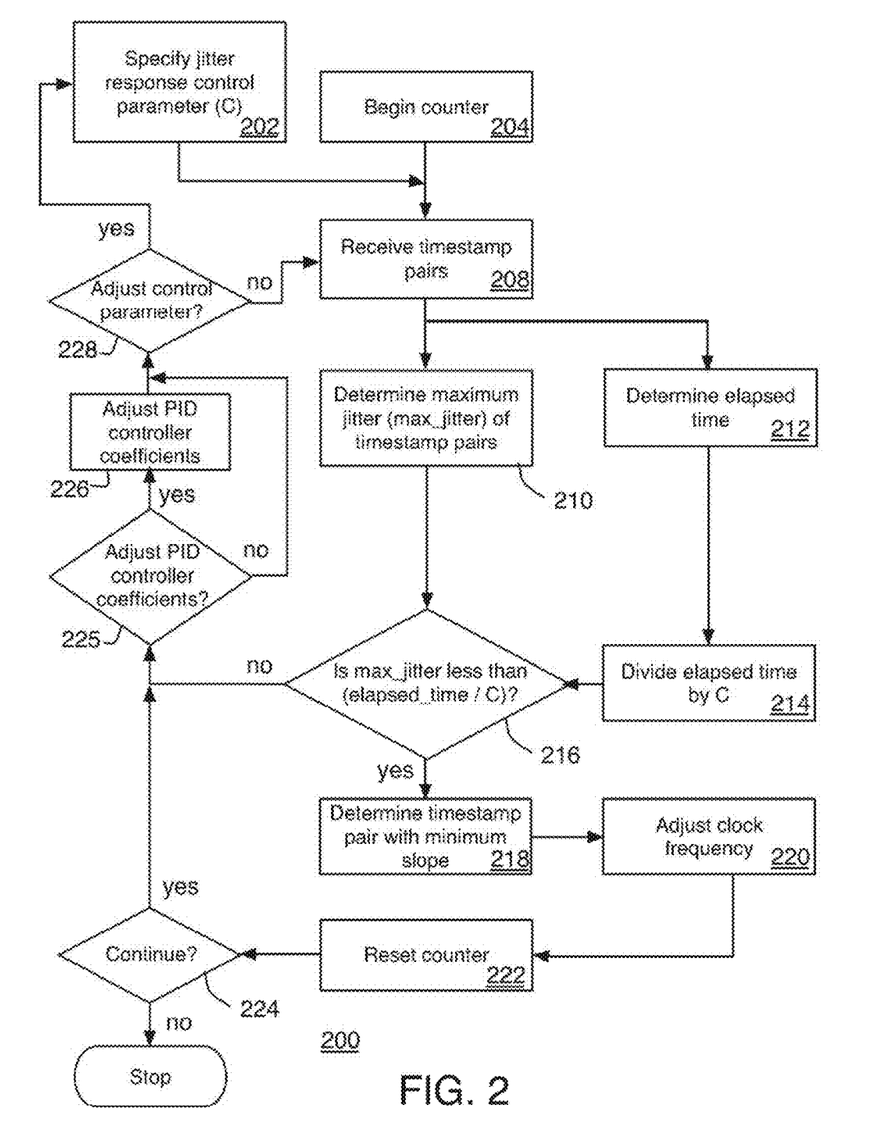
FIG. 2 illustrates an example process.

FIG. 2 illustrates a flow diagram of an example process 200 for implementing an adaptive PID controller according to various implementations of the present disclosure. In various implementations, process 200 may be used to control the frequency of a local TS signal in response to varying amounts of jitter in a transmitter TS signal. Process 200 may include one or more operations, functions or actions as illustrated by one or more of blocks 202, 204, 208, 210, 212, 214, 216, 218, 220, 222, 224, 225, 226 and 228 of FIG. 2. By way of non-limiting example, process 200 will be described herein with reference to the example A/V receiver of FIG. 1.

Figure 3:
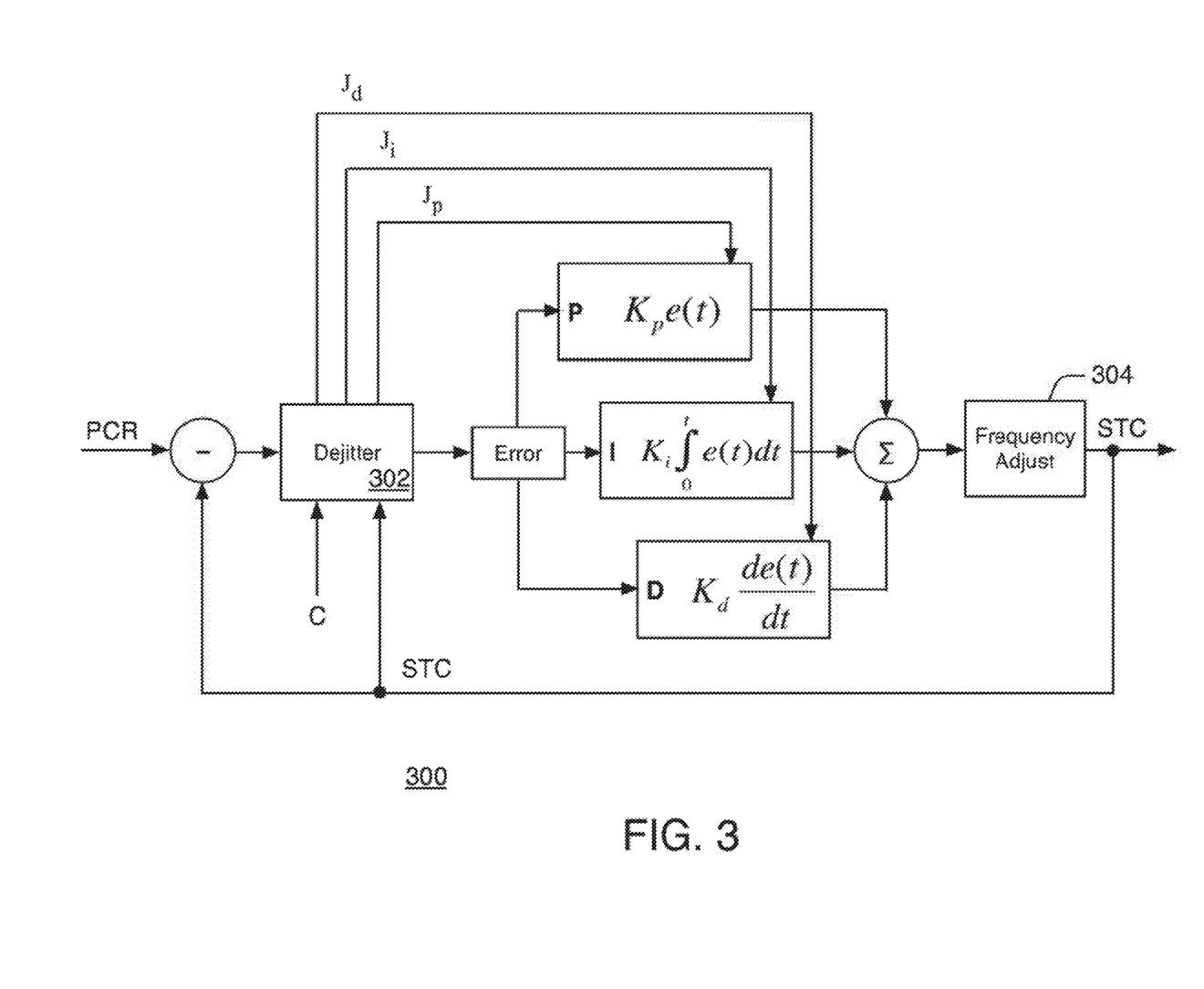
FIG. 3 illustrates an example adaptive PID controller.

Process 200 will also be described herein with reference to FIG. 3 where a diagrammatic representation of an adaptive PID controller 300 according to various implementations of the present disclosure is depicted. As shown in FIG. 3, controller 300 includes a dejitter module 302 and a frequency adjust module 304. In various implementations, dejitter module 302 acts to analyze a local TS signal (STC signal) and the difference between the local TS signal and a transmitter TS signal (PCR signal). When doing so, dejitter module 302 may analyze TS pairs of the form $\{(|TS_T-TS_L|)(TS_L)\}$, where $TS_T$ refers to the value of a transmitter TS (e.g., time value of the leading edge of a PCR signal pulse), and $TS_L$ refers to the value of a local TS (e.g., time value of the leading edge of a STC signal pulse).

Dejitter module 302 may collect and analyze TS pairs during a particular time interval (elapsed_time) where the time interval may be determined in part by an elapsed time parameter monitored by dejitter module 302. For example, dejitter module 302 may collect and analyze at least a minimum group size of thirty-two TS pairs. In various implementations, dejitter module 302 may analyze the group of TS pairs to determine a slope for each pair, the maximum jitter for the group (and the value of that maximum jitter (e.g., max_jitter=$|TS_T-TS_L|$), and the TS pair having a smallest slope. In various implementations, CRM 106 of A/V receiver 102 of FIG. 1 may provide the functionality of dejitter module 302, while CRM 106 in conjunction with OSC 112 and STC counter 116 may provide the functionality of frequency adjust module 304.

Further, in various implementations, dejitter module 302 may adjust the coefficients of PID controller 300 in response to analyzing TS pairs. For instance, depending upon an amount of jitter detected in the TS pairs, dejitter module 302 may adjust the FID controller coefficients $K_p$, $K_i$ and/or $K_d$ to provide more aggressive clock synchronization or to provide more suppressed clock synchronization. For example, for greater amounts of jitter (e.g., larger values of max_Jitter) evaluated in TS pairs, dejitter module 302 may adjust coefficients $K_p$, $K_i$ and/or $K_d$ to increase the rate of clock frequency adjustment by module 304. On the other hand, for lesser amounts of jitter (e.g., smaller values of max_Jitter) evaluated in TS pairs, dejitter module 302 may adjust coefficients $K_p$, $K_i$ and/or $K_d$ to decrease the rate of clock frequency adjustment by module 304.

Figure 4:
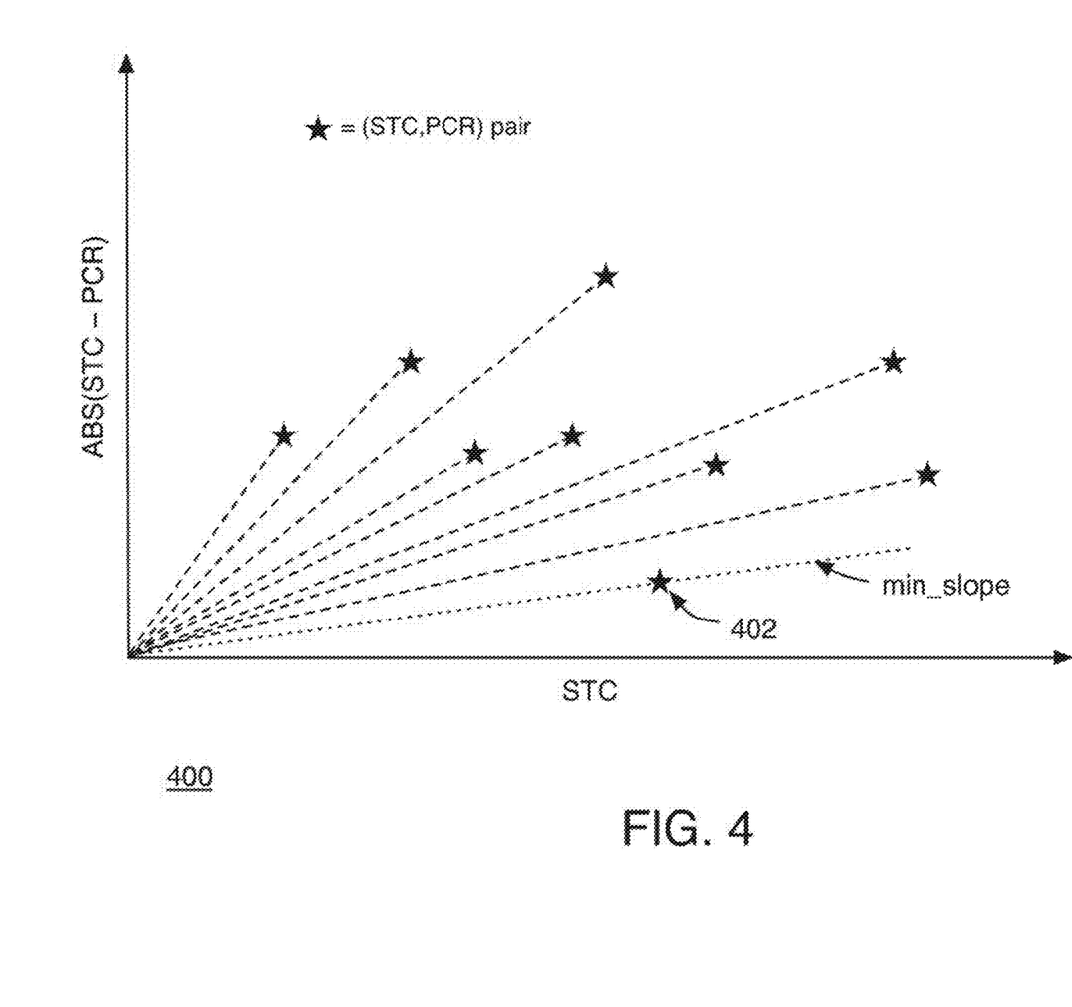
FIG. 4 illustrates an example plot of timestamp pairs.

FIG. 4 illustrates an example plot 400 of a group of example TS pairs in accordance with various implementations of the present disclosure. Plot 400 includes example transmitter-receiver TS pairs (e.g., (STC, PCR)) as a function of the absolute value of the quantity (STC−PCR) and the time value of the receiver timestamp (STC). As shown in FIG. 4, each group of TS pairs analyzed in this manner will exhibit at least one TS pair 402 having a minimum slope (min_slope) of value {ABS(STC−PCR)/STC}.

Figure 5:
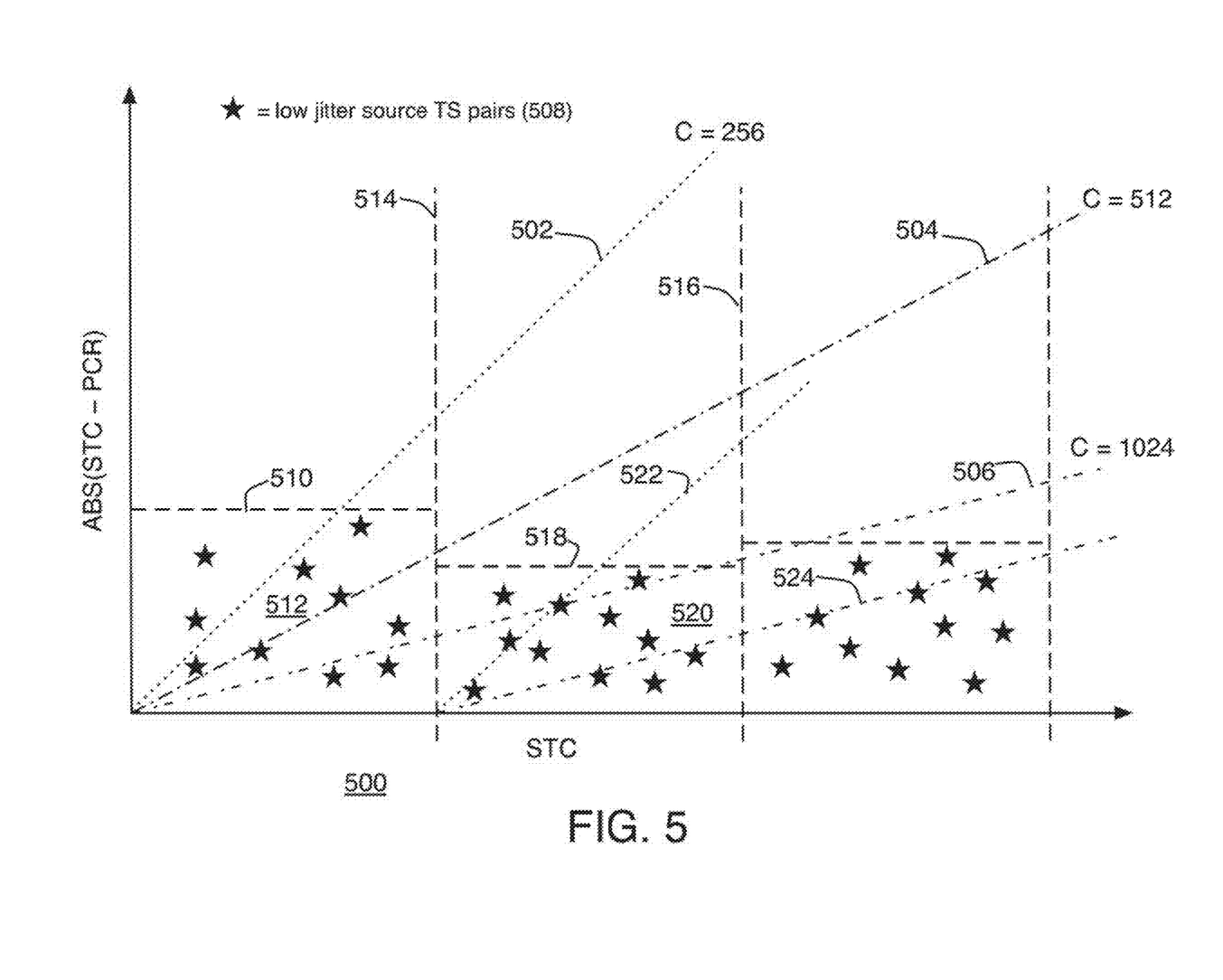
FIG. 5 illustrates an example plot of timestamp pairs.

Returning the discussion of FIG. 2, process 200 may begin at block 202 where a jitter response control parameter may be specified. In various implementations, block 202 may include specifying a control parameter for an adaptive PID controller. For example, block 202 may involve specifying a jitter response control parameter (C) that determines, in part, the jitter response of an adaptive PID controller algorithm such as PID controller 300 of FIG. 3. For instance, FIG. 5 illustrates an example plot 500 of TS pairs in accordance with various implementations of the present disclosure. As shown in FIG. 5, a line 502 represents elapsed time (e.g., since the last time clock frequency was adjusted) divided by the jitter response control parameter (C) having a value of C=256, while a line 504 represents elapsed time divided by a value of C=512, and a line 506 represents elapsed time divided by a value of C=1024, to provide several non-limiting examples.

At block 204, a counter may be initiated. For example, a timer may be initiated by dejitter module 302. At block 208, multiple TS pairs may be received. For example, referring to FIGS. 5 and 3, a timer may be initiated (e.g., at the origin of plot 500) and TS pairs 508 from a low jitter source may be collected by dejitter module 302. At block 210, the maximum jitter (max_jitter) of a group of TS pairs may be determined and, at block 212, an elapsed time value may be determined. For example, a maximum jitter value 510 (e.g., a particular value of $|TS_T-TS_L|$) for a first group of received TS pairs 512) may be obtained at an elapsed time 514. In various implementations, a counter function employed in blocks 204 and 212 may be provided by dejitter module 302 counting the number of STC pulses it receives. At block 214, the elapsed time (elapsed_time) determined at block 212 may be divided by the control parameter C (specified at block 202) to provide a quantity (elapsed_time/C).

At block 216, a determination may be made as to whether the value of maximum jitter (max_jitter) is less than the value of (elapsed_time/C). If block 216 results in a positive determination then process 200 may proceed to block 218 where a TS pair having a minimum slope may be determined. For example, block 218 may involve determining the TS pair in group 512 that has a minimum slope (see, e.g., FIG. 3). A local clock frequency may then be adjusted at block 220 in response to the TS pair identified at block 218. For example, referring also to FIG. 1, in various implementations block 220 may involve CRM 106 implementing an adaptive PID controller algorithm, such as PID controller 300, and using the remote timestamp value (e.g., the PCR value) of the TS pair identified at block 218 to control OSC 112 using a frequency control signal. By controlling OSC 112 in this manner, CRM 106 may adjust the clock frequency of its local timestamp signal (STC) as generated by STC timer 116.

If the clock frequency is adjusted at block 220, then process 200 may continue at block 222 where the counter is reset. For instance, as shown in FIG. 5, if clock frequency was adjusted at block 220, then the counter may be reset to zero at time 514.

At block 224 a determination may be made regarding whether to continue process 200. If the result of block 224 is negative then process 200 may end. If, however, the result of block 224 is positive, then process 200 may continue at block 225 as will be described further below.

Returning to discussion of the determination of block 216, if the maximum jitter is equal to or greater than the value of (elapsed_time/C) then process 200 may continue at block 225 where a determination regarding whether to adjust the PID controller coefficients may be made. For example, depending on the amount of jitter detected in the TS pairs (e.g., the value of max_jitter), dejitter module 302 may decide to adjust the coefficients $K_p$, $K_i$ and/or $K_d$ of PID controller 300. If the result of block 225 is positive, then process 200 may continue to block 226 where the PID controller coefficients may be adjusted. In various implementations, block 226 may involve dejitter module 302 specifying one or more PID controller coefficient adjustment parameters $J_p$, $J_i$ and/or $J_d$, which may be used to adjust the responsiveness of PID controller 300 by modifying the PID coefficients (e.g., via $(K_p*J_p)$, $(K_i*J_i)$, $(K_d*J_d)$). For example, block 226 may involve dejitter module 302 using the PID controller coefficient adjustment parameters to increase the frequency that module 304 adjusts the clock signal if the evaluated jitter of the TS pairs (e.g., as measured by max_jitter) exceeds an upper threshold, or to decrease the frequency that module 304 adjusts the clock signal if the evaluated jitter of the TS pairs falls below a lower threshold.

Process 200 may continue at block 228 where a determination regarding whether to adjust the jitter response control parameter C may be made. For example, as described above, the result of the determination undertaken at block 216 depends on the value of three factors: the elapsed time (elapsed_time), the maximum jitter (max_jitter) of a group of TS pairs, and the magnitude of the jitter response control parameter C. In various implementations, the determination regarding whether to adjust the jitter response control parameter C at block 228 may be made in response to a change in jitter of the receiver timestamps received at an A/V receiver.

Referring again to the example plot 500 of FIG. 5, for the line 502 (C=256), the value of the maximum jitter 510 would be less than the value of (elapsed_time/C) at time 514 and therefore, for this value of C, the local clock frequency of the A/V receiver would be adjusted at block 220. However, if values of C corresponding to either line 504 (C=512) or line 506 (C=1024) have been specified at block 202, then die maximum jitter 510 would not be less than the value of (elapsed_time/C) at time 514 and therefore, for these values of C, the local clock frequency of the A/V receiver would not be adjusted. Hence for these example values of C, the result of the determination at block 216 would be negative.

Returning to the discussion of block 228, and continuing with example of a value of C=256 having been specified at block 202 so that the maximum jitter 510 was less than the value of (elapsed_time/C) and therefore the clock frequency was adjusted at time 514, if the control parameter C is not adjusted at block 228, then if during a next time interval (represented by the difference between a time 516 and time 514) a maximum jitter value 518 of a next group of TS pairs 520 may again be less than the value of (elapsed_time/C) as represented by line 522, the clock frequency may then be adjusted again at time 516. If however, a decision is made to adjust the control parameter C at block 228, and process 200 returns to block 202 where, for example, the value of C is specified as C=1024, then, at time 516, the maximum jitter 512 determined again at block 210 may be greater than the value of (elapsed_time/C) as represented by line 524 and the clock frequency may not be adjusted at time 516. In this manner, the jitter response of a PID controller in accordance with the present disclosure may be adapted.

Figure 6:
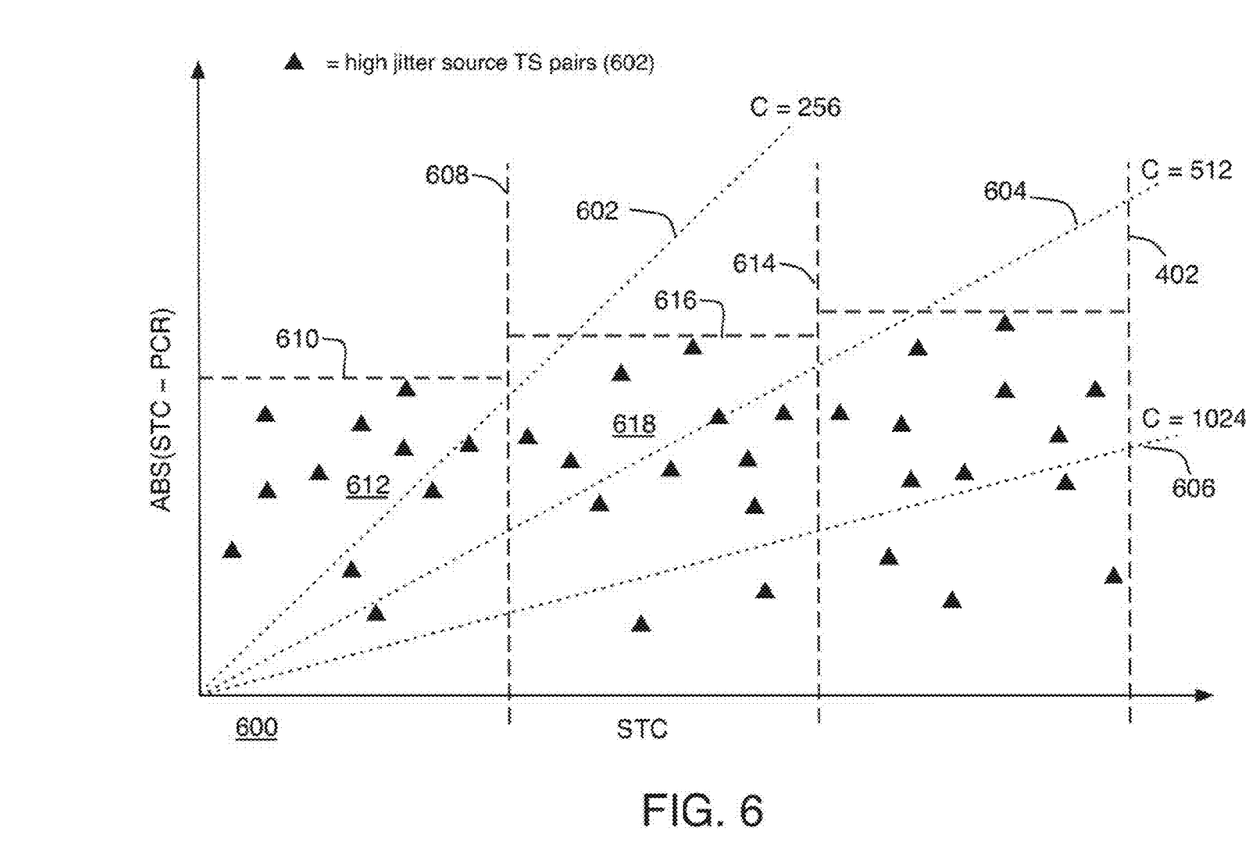
FIG. 6 illustrates an example plot of timestamp pairs.

FIG. 6 illustrates another example plot 600 of TS pairs in accordance with various implementations of the present disclosure. By way of contrast to FIG. 5, example plot 600 illustrates sampling of TS pairs 602 from a relatively high jitter source. As shown in FIG. 6, and as similar to the non-limiting examples of plot 500 of FIG. 5, line 602 represents elapsed time divided by the jitter response control parameter C=256, line 604 represents elapsed time divided by C=512, and line 606 represents elapsed time divided by C=1024.

Because of the relatively larger amount of jitter in TS pairs 602 as compared to TS pairs 508 of example plot 500, at a first time 608 a maximum jitter 610 of a first TS pair group 612 will be greater than the values of (elapsed_time/C) of any of lines 602, 604 or 606. Thus, at time 608, process 200 would not result in clock frequency adjustment in this example. However, at a next time 614, a maximum jitter 616 of a second TS pair group 618 will be greater than the values of (elapsed_time/C) of lines 604 and 606 but will be less than the value of (elapsed_time/C) for line 602. Thus, at time 614, process 200 would result in clock frequency adjustment in this example for a value of C corresponding to line 602.

Figure 7:
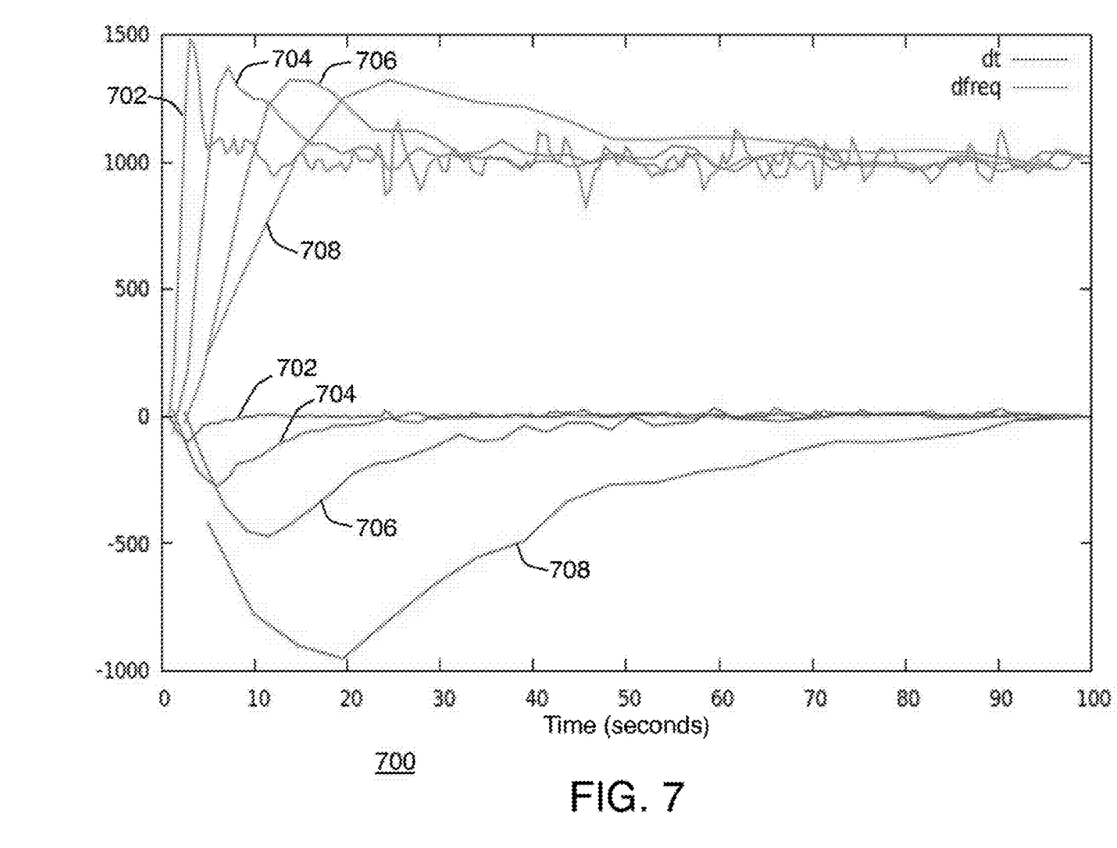
FIG. 7 illustrates example simulation results.

While the implementation of example process 200, as illustrated in FIG. 2, may include the undertaking of all blocks shown in the order illustrated, the present disclosure is not limited in this regard and, in various examples, implementation of process 200 may include the undertaking only a subset of all blocks shown and/or in a different order than illustrated. In addition, any one or more of the processes and/or blocks of FIG. 2 may be undertaken in response to instructions provided by one or more computer program products. Such program products may include signal bearing media providing instructions that, when executed by, for example, one or more processor cores, may provide the functionality described herein. The computer program products may be provided in any form of computer readable medium. Thus, for example, a processor including one or more processor core(s) may undertake one or more of the blocks shown in FIG. 2 in response to instructions conveyed to the processor by a computer readable medium As described above, clock recovery mechanisms incorporating adaptive PID controller algorithms in accordance with the present disclosure may exhibit broad adaptability with respect to incoming jitter on the clock recovery stimulus. For instance, FIG. 7 illustrates example simulation results 700 for system responsiveness (e.g., of algorithm 300) to a 1000 part-per-million (ppm) clock difference for varying amounts of jitter in a 90 kHz input clock signal (e.g., an input SCR signal) expressed in terms of both the time difference between TS pairs (e.g., PCR, STC pairs) and the frequency difference between those TS pairs. Simulation results 700 include results for random jitter at 12.5% of inter-stimulus time (e.g., between TS pairs) 702, at 25% of inter-stimulus time 704, at 50% of inter-stimulus time 706, and at 100% of inter-stimulus time 708.

Figure 8:
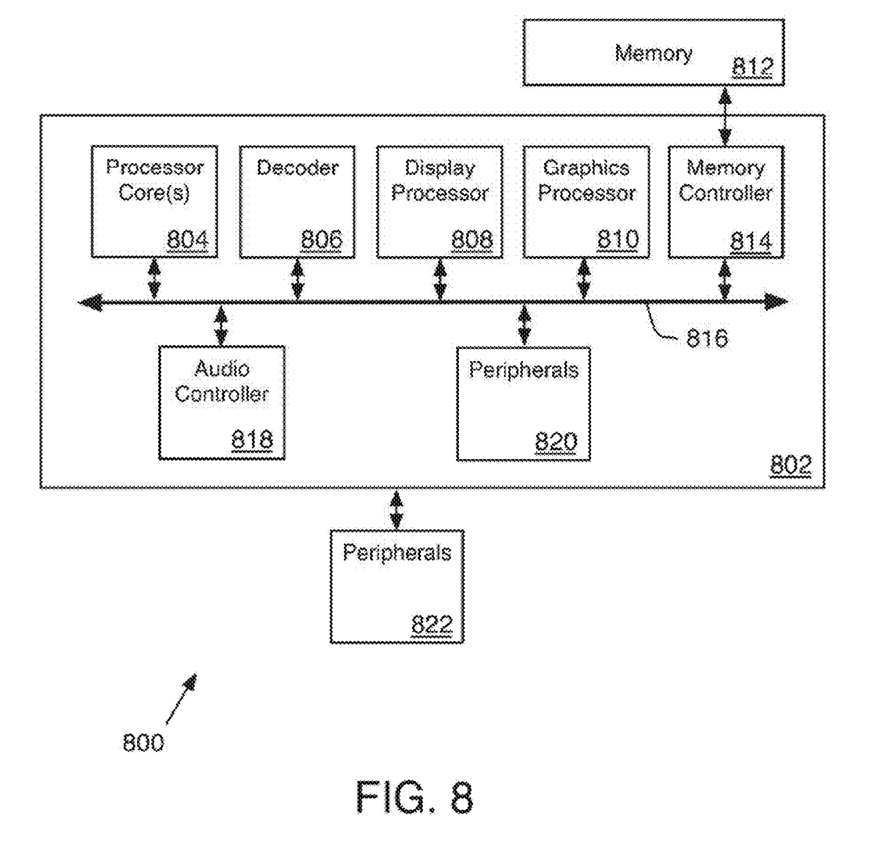
FIG. 8 is an illustrative diagram of an example system, all arranged in accordance with at least some implementations of the present disclosure.

FIG. 8 illustrates an example system 800 in accordance with the present disclosure. System 800 may be used to perform some or all of the various functions discussed herein and may include any device or collection of devices capable of implementing adaptive PID controllers in accordance with various implementations of the present disclosure. For example, system 800 may include selected components of a computing platform or device such as a desktop, mobile or tablet computer, a smart phone, a set top box, etc., although the present disclosure is not limited in this regard. In some implementations, system 800 may be a computing platform or SoC based on Intel® architecture (IA) for CE devices. It will be readily appreciated by one of skill in the art that the implementations described herein can be used with alternative processing systems without departure from the scope of the present disclosure.

System 800 includes a processor 802 having one or more processor cores 804. Processor cores 804 may be any type of processor logic capable at least in part of executing software and/or processing data signals. In various examples, processor cores 804 may include CISC processor cores, RISC microprocessor cores, VLIW microprocessor cores, and/or any number of processor cores implementing any combination of instruction sets, or any other processor devices, such as a digital signal processor or microcontroller.

Processor 802 also includes a decoder 806 that may be used for decoding instructions received by, e.g., a display processor 808 and/or a graphics processor 810, into control signals and/or microcode entry points. While illustrated in system 800 as components distinct from core(s) 804, those of skill in the art may recognize that one or more of core(s) 804 may implement decoder 806, display processor 808 and/or graphics processor 810. In some implementations, processor 802 may be configured to undertake any of the processes described herein including the example process described with respect to FIG. 2. Further, in response to control signals and/or microcode entry points, decoder 806, display processor 808 and/or graphics processor 810 may perform corresponding operations.

Processing core(s) 804, decoder 806, display processor 808 and/or graphics processor 810 may be communicatively and/or operably coupled through a system interconnect 816 with each other and/or with various other system devices, which may include but are not limited to, for example, a memory controller 814, an audio controller 818 and/or peripherals 820. Peripherals 820 may include, for example, a unified serial bus (USB) host port, a Peripheral Component Interconnect (PCI) Express port, a Serial Peripheral Interface (SPI) interface, an expansion bus, and/or other peripherals. While FIG. 8 illustrates memory controller 814 as being coupled to decoder 806 and the processors 808 and 810 by interconnect 816, in various implementations, memory-controller 814 may be directly coupled to decoder 806, display processor 808 and/or graphics processor 810.

In some implementations, system 800 may communicate with various I/O devices not shown in FIG. 8 via an I/O bus (also not shown). Such I/O devices may include but are not limited to, for example, a universal asynchronous receiver/transmitter (UART) device, a USB device, an I/O expansion interface or other I/O devices. In various implementations, system 800 may represent at least portions of a system for undertaking mobile, network and/or wireless communications.

System 800 may further include memory 812. Memory 812 may be one or more discrete memory components such as a dynamic random access memory (DRAM) device, a static random access memory (SRAM) device, flash memory device, or other memory devices. While FIG. 8 illustrates memory 812 as being external to processor 802, in various implementations, memory 812 may be internal to processor 802. Memory 812 may store instructions and/or data represented by data signals that may be executed by processor 802 in undertaking any of the processes described herein including the example process described with respect to FIG. 2. For example, memory 812 may store PID control parameter values as described herein. In some implementations, memory 812 may include a system memory portion and a display memory portion.

The devices and/or systems described herein, such as example system 100 represent several of many possible device configurations, architectures or systems in accordance with the present disclosure. Numerous variations of systems such as variations of example system 100 are possible consistent with the present disclosure.

The systems described above, and the processing performed by them as described herein, may be implemented in hardware, firmware, or software, or any combination thereof. In addition, any one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A computer-implemented method, comprising:
specifying a jitter response control parameter;
receiving a plurality of timestamp pairs;
determining a maximum jitter of the plurality of timestamp pairs;
determining an elapsed time; and
adjusting at least one of a clock frequency if the maximum jitter is less than the elapsed time divided by the jitter response control parameter or a Proportional-Integral-Derivative (PID) controller coefficient.

2. The method of claim 1, wherein adjusting the clock frequency comprises determining a timestamp pair of the plurality of timestamp pairs having a minimum slope.

3. The method of claim 1, wherein each timestamp pair of the plurality of timestamp pairs comprises a transmitter timestamp and a receiver timestamp.

4. The method of claim 3, wherein the receiver timestamp comprises a receiver timestamp signal, and wherein adjusting the clock frequency comprises adjusting a frequency of the receiver timestamp signal.

5. The method of claim 1, wherein specifying the jitter response control parameter comprises specifying the jitter response control parameter of a PID controller implemented by a clock recovery module of an Audio/Video (A/V) receiver, and wherein receiving the plurality of timestamp pairs comprises receiving the plurality of timestamp pairs at the clock recovery module.

6. The method of claim 1, wherein each timestamp pair of the plurality of timestamp pairs comprises a transmitter timestamp and a receiver timestamp, wherein an input A/V signal includes the transmitter timestamps of the plurality of timestamp pairs, and wherein the method further comprises:
adjusting the jitter response control parameter in response to a change in jitter of the input A/V signal.

7. The method of claim 6, wherein the transmitter timestamp comprises one of a Program Clock Reference (PCR) timestamp or a System Clock Reference (SCR) timestamp, and wherein the receiver timestamp comprises a System Time Clock (STC) timestamp.

8. The method of claim 6, wherein the transmitter timestamp comprises a timestamp generated by a System Time Clock (STC) of a source of the input A/V signal.

9. A device, comprising:
an A/V receiver including:
a clock recovery module (CRM) coupled to a clock signal generator and a counter, wherein the CRM is configured to:
receive a plurality of timestamp pairs, the plurality of timestamp pairs including transmitter timestamps received by the clock recovery module in an input A/V signal and receiver timestamps generated by the counter;
determine a maximum jitter of the plurality of timestamp pairs;
determine an elapsed time; and
adjust at least one of a frequency of the clock signal generator if the maximum jitter is less than the elapsed time divided by a jitter response control parameter or a Proportional-Integral-Derivative (PID) controller coefficient.

10. The device of claim 9, wherein the CRM is configured to adjust the frequency of the clock signal generator at least in part in response to determining a timestamp pair of the plurality of timestamp pairs having a minimum slope.

11. The device of claim 9, wherein the CRM is further configured to:
adjust the jitter response control parameter in response to a change in jitter of the input A/V signal.

12. The device of claim 9, wherein the transmitter timestamp comprises one of a Program Clock Reference (PCR) timestamp or a System Clock Reference (SCR) timestamp, and wherein the receiver timestamp comprises a System Time Clock (STC) timestamp.

13. A system, comprising:
a processor and a memory coupled to the processor, wherein instructions in the memory configure the processor to:
specify a jitter response control parameter;
receive a plurality of timestamp pairs;
determine a maximum jitter of the plurality of timestamp pairs;
determine an elapsed time; and
adjust at least one of a clock frequency if the maximum jitter is less than the elapsed time divided by the jitter response control parameter or a Proportional-Integral-Derivative (PID) controller coefficient.

14. The system of claim 13, wherein instructions in the memory configure the processor to adjust the clock frequency by determining, at least in part, a timestamp pair of the plurality of timestamp pairs having a minimum slope.

15. The system of claim 13, wherein each timestamp pair of the plurality of timestamp pairs comprises a transmitter timestamp and a receiver timestamp.

16. The system of claim 13, wherein instructions in the memory that configure the processor to specify the jitter response control parameter comprise instructions that configure the processor to specify the jitter response control parameter of a PID controller implemented by a clock recovery module of an Audio/Video (A/V) receiver, and wherein instructions in the memory that configure the processor to receive the plurality of timestamp pairs comprises instructions that configure the processor to receive the plurality of timestamp pairs at the clock recovery module.

17. The system of claim 13, wherein instructions in the memory further configure the processor to:
adjust the jitter response control parameter in response to a change in jitter of an input A/V signal.

18. The system of claim 13, wherein each timestamp pair of the plurality of timestamp pairs comprises a transmitter timestamp and a receiver timestamp, wherein the transmitter timestamp comprises one of a Program Clock Reference (PCR) timestamp or a System Clock Reference (SCR) timestamp, and wherein the receiver timestamp comprises a System Time Clock (STC) timestamp.

19. An article comprising a non-transitory computer readable program product having stored therein instructions that, if executed, result in:
specifying a jitter response control parameter;
receiving a plurality of timestamp pairs;
determining a maximum jitter of the plurality of timestamp pairs;
determining an elapsed time; and
adjusting at least one of a clock frequency if the maximum jitter is less than the elapsed time divided by the jitter response control parameter or a Proportional-Integral-Derivative (PID) controller coefficient.

20. The article of claim 19, wherein adjusting the clock frequency comprises determining a timestamp pair of the plurality of timestamp pairs having a minimum slope.

21. The article of claim 19, wherein each timestamp pair of the plurality of timestamp pairs comprises a transmitter timestamp and a receiver timestamp.

22. The article of claim 21, wherein the receiver timestamp comprises a receiver timestamp signal, and wherein adjusting the clock frequency comprises adjusting a frequency of the receiver timestamp signal.

23. The article of claim 19, wherein specifying the jitter response control parameter comprises specifying the jitter response control parameter of a PID controller implemented by a clock recovery module of an Audio/Video (A/V) receiver, and wherein receiving the plurality of timestamp pairs comprises receiving the plurality of timestamp pairs at the clock recovery module.

24. The article of claim 19, wherein each timestamp pair of the plurality of timestamp pairs comprises a transmitter timestamp and a receiver timestamp, wherein an input A/V signal includes the transmitter timestamps of the plurality of timestamp pairs, and the computer program product having stored therein further instructions that, if executed, result in:
adjusting the jitter response control parameter in response to a change in jitter of the input A/V signal.

25. The article of claim 24, wherein the transmitter timestamp comprises one of a Program Clock Reference (PCR) timestamp or a System Clock Reference (SCR) timestamp, and wherein the receiver timestamp comprises a System Time Clock (STC) timestamp.

26. The article of claim 24, wherein the transmitter timestamp comprises a timestamp generated by a System Time Clock (STC) of a source of the input A/V signal.

* * * * *